May 26, 1931.   C. F. STRAHAN   1,806,987
HONEYCOMB AND COMB FOUNDATION
Filed Dec. 30, 1927

Inventor
Chas. F. Strahan
By Chas. J. Williamson
Attorney

Patented May 26, 1931

1,806,987

UNITED STATES PATENT OFFICE

CHARLES F. STRAHAN, OF LINWOOD, NEBRASKA

HONEYCOMB AND COMB FOUNDATION

Application filed December 30, 1927. Serial No. 243,718.

Various devices or contrivances have been employed by beekeepers to prevent the queen depositing eggs in the super combs in which it is desired that the bees shall only place honey. Thus, a queen excluder or a honey board has been used to keep the queen out of the supers or storage compartments of the hive. Such devices, besides necessitating their use as something extra or additional to the hive are otherwise objectionable. For example, the queen excluder is believed to interfere with the ventilation of the hive by the bees. By restricting the means of communication for the worker bees, it causes congestion and adds to the labor of the worker bees. The object of my invention is to assure the use of the comb provided for honey storage, for honey entirely, and to do that by means which will dispense with use of such accessory devices as queen excluders.

My invention consists in whatever is described by or is included within the terms or scope of the appended claims.

Figure 1:
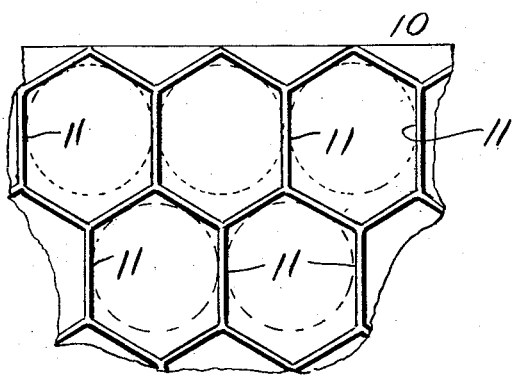
Fig. 1 is a front elevation of a piece of comb foundation embodying my invention.

Referring to the drawings it will be seen that the cell bases of the comb foundation, 10, instead of being of the usual practically perfect hexagonal form or shape have the two vertical sides, 11, longer than the other side, and as the bees will draw out the walls correspondingly, the complete or finished cell will be of vertically elongated hexagonal form. In cells thus elongated the queen will not lay eggs, but the worker bees will use the cells exclusively for the storage of honey.

The elongation should be vertical rather than horizontal, because if horizontal, the cells in hot weather may enlarge to an extent that might cause the queen to lay drone eggs in them. Moreover, the cell vertically elongated has greater strength.

Hexagon cells used by the bees for worker brood is approximately one-fifth of an inch in diameter. Hexagon cells used for drone brood is approximately one-fourth of an inch in diameter. Practically all foundation manufactured is the worker size, the cells being one-fifth of an inch in diameter, and having a side wall approximately one-eighth inch long.

As an example of proportions of cell walls which will give satisfactory results the vertical walls may be a little more than nine-sixty-fourths of an inch long, while the diagonal walls are about one-eighth of an inch long. It is more satisfactory, however, to make the vertical wall five-thirty-seconds of an inch long.

Besides dispensing with queen excluders and the like and thereby relieving congestion and aiding the bees in entering the storage compartments of the hive, my invention helps to prevent swarming. Anything which relieves congestion or aids free ventilation helps prevent swarming.

Figure 2:
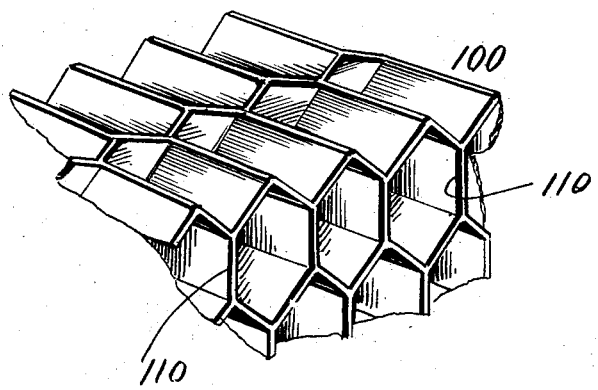
Fig. 2 is a perspective view of a section of finished comb embodying my invention.

The finished comb, 100, shown in Fig. 2 has the vertical elongated side walls, 110.

I claim:

1. Comb foundation having cell bases with opposite side walls longer comparatively than the remaining side walls.

2. Comb foundation having cell bases with vertical side walls longer comparatively than the diagonal walls.

In testimony whereof I hereunto affix my signature.

CHARLES F. STRAHAN.